(12) United States Patent
Fujita et al.

(10) Patent No.: US 7,303,229 B2
(45) Date of Patent: Dec. 4, 2007

(54) SEAT CONSTRUCTION

(75) Inventors: Etsunori Fujita, Hiroshima (JP); Kazuyoshi Chizuka, Hiroshima (JP); Seiji Kawasaki, Hiroshima (JP); Yasuhide Takata, Hiroshima (JP)

(73) Assignee: Delta Tooling Co., Ltd., Akiku, Hiroshima-Shi, Hiroshima (JP)

( * ) Notice: Subject to any disclaimer, the term of this patent is extended or adjusted under 35 U.S.C. 154(b) by 200 days.

(21) Appl. No.: 10/520,458

(22) PCT Filed: Jul. 17, 2003

(86) PCT No.: PCT/JP03/09089

§ 371 (c)(1),
(2), (4) Date: May 23, 2005

(87) PCT Pub. No.: WO2004/007238

PCT Pub. Date: Jan. 22, 2004

(65) Prior Publication Data

US 2005/0231011 A1 Oct. 20, 2005

(30) Foreign Application Priority Data

Jul. 17, 2002 (JP) ............................. 2002-208957

(51) Int. Cl.
*B60N 2/42* (2006.01)
(52) U.S. Cl. ........................ 297/216.14; 297/216.13; 297/216.1; 297/452.18; 297/452.56
(58) Field of Classification Search ............ 297/216.1, 297/216.13, 216.14, 216.15, 216.16, 216.18, 297/216.19, 452.56, 452.18; 244/122 R; 296/68.1, 65.1
See application file for complete search history.

(56) References Cited

U.S. PATENT DOCUMENTS

| | | | | |
|---|---|---|---|---|
| 4,588,172 A * | 5/1986 | Fourrey et al. | ............... | 267/89 |
| 5,295,729 A | 3/1994 | Viano | .................... | 297/216.14 |
| 5,746,467 A * | 5/1998 | Jesadanont | .................. | 296/68.1 |
| 5,829,827 A * | 11/1998 | Schaper et al. | .......... | 297/216.1 |
| 6,378,939 B1 * | 4/2002 | Knoll et al. | ............. | 297/216.1 |
| 6,485,098 B1 * | 11/2002 | Vits et al. | .............. | 297/216.13 |
| 6,860,561 B2 * | 3/2005 | Takata | ..................... | 297/378.1 |

FOREIGN PATENT DOCUMENTS

| | | |
|---|---|---|
| JP | 2002012072 | 1/2002 |
| JP | 2003180481 | 7/2003 |

* cited by examiner

*Primary Examiner*—David Dunn
*Assistant Examiner*—Erika Garrett
(74) *Attorney, Agent, or Firm*—Wolf, Block, Schorr & Solis-Cohen LLP

(57) ABSTRACT

A flat spring member (40) mainly serving as a vibration absorptive function at a normal use is engaged with a supporting frame member (130) which displaces backward along with deformation of a seat back (20) by backward moment applied to the seat back (20), and the other end is engaged with a front edge frame (102) disposed in the vicinity of the front edge of a cushion frame. Therefore, when an impact force from front or back equal to or more than that prescribed is applied, the flat spring member (40) increases in tension by backward moment applied to the seat back (20), and serves as a function to increase again the intensity of the backward moment of the seat back (20), which was once lowered by deformation of the side frame (101) of the cushion frame.

16 Claims, 10 Drawing Sheets

F I G. 7
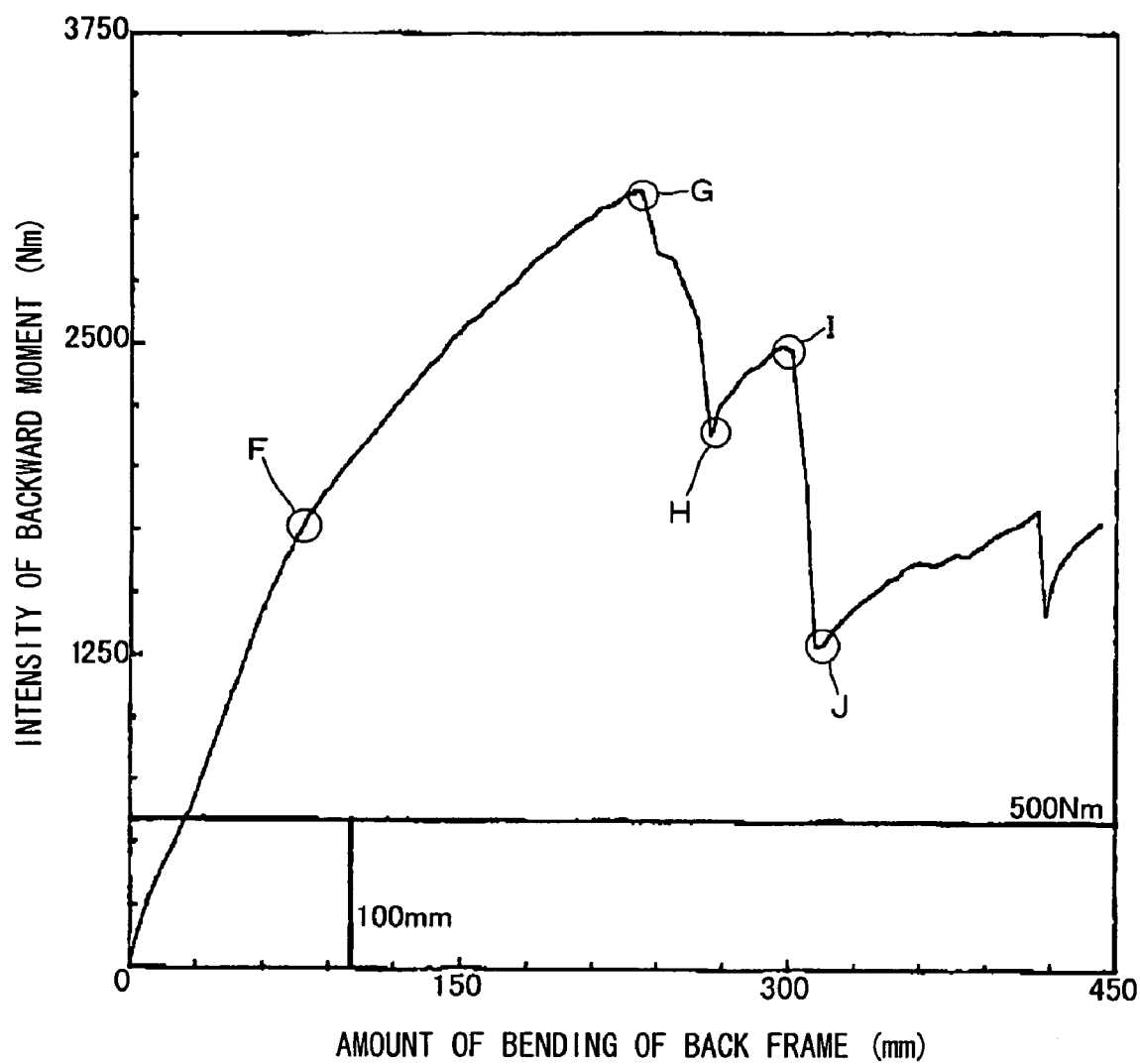

SEAT CONSTRUCTION

FIELD OF THE INVENTION

The present invention relates to a seat structure, more in detail, to a seat structure suitable for transportation machines such as a plane, a train, a ship, a fork lift, an automobile and the like, or for various chairs and a wheel chair used inside or outside of a building.

BACKGROUND OF THE INVENTION

In a seat used in a plane, a train, a ship, an automobile and the like, a seat back is required to be tilted not more than necessity when a large impact force is applied upon a head-on collision or a rear-end collision. When a seat back tilts too deep, a passenger on a back seat may be injured. It is also conceivable that the leg is caught in a steering, which may cause a risk to receive an injury by a load on the waist or the like or receive an injury on the head by baggage put on the back seat. Therefore, it is required to restrain a tilt of a seat back to restrain displacement of the human body by pushing the passenger's back to a cushioning material disposed on a back frame so as to increase absorbency of impact. Hitherto, various countermeasures to increase yield strength (the backward moment strength) against such a backward rotation moment applied to the seat back have been proposed. However, most of them relate to improvement of a seat frame structure, and even when such an improved seat frame is used, development of technology capable of increasing the intensity of the backward moment has been still required.

The present invention has been made in view of the above problems and an object of the present invention is to provide a seat structure capable of increasing intensity of the backward moment more than before so that the impact resistance can be further improved even when a seat frame designed to reduce in weight is used.

SUMMARY OF THE INVENTION

In recent years, the present inventor has been proposed a seat structure in which a three-dimensional net member (solid knitted fabric) having a thickness of several millimeters to several tens millimeters is strained on a seat frame. According to this seat structure, since this three-dimensional net member has a tension structure, it has a characteristic that it can be provided with a sufficient vibration absorptive function as a seat structure for a transportation machine owing to a damping function of the tension structure by supporting it via a spring mechanism as well as its being light in weight. However, various spring mechanisms used here are to serve mainly as a vibration absorptive function and do not positively possess a function to serve as a high-impact material capable of resisting against impact force from front or back equal to or stronger than that prescribed due to a head-on or rear-end collision. Even in such a structure, increase in the intensity of the backward moment as described above is mainly achieved with a seat frame structure. The present inventors have noted a structure in which a spring mechanism and a damping mechanism used to absorb vibration in normal times are forced to effectively operate as a high-impact material to increase the intensity of the backward moment along with the seat frame structure when received an impact force from front or back due to a head-on or rear-end collision, thereby exhibiting the backward moment larger in intensity than in the case of having the same seat frame structure.

In one embodiment of the present invention, a seat structure includes a flat spring member disposed in such a manner that one end thereof is in engagement with a frame member to be displaced backward by backward moment, which deforms a seat back under an impact force from front or back equal to or stronger than that anticipated. Another end is in engagement with a frame member disposed in the vicinity of the front edge of a cushion frame, wherein the flat spring member increases in tension as the seat back is deformed.

In another embodiment of the present invention, a seat structure includes a cushion frame with a frame member deforming under an impact force from front or back equal to or stronger than that anticipated, and a flat spring member is disposed in such a manner that one end thereof is in engagement with a frame member to be displaced backward along with deformation of a seat back by backward moment applied to the seat back. Another end is in engagement with the frame member disposed in the vicinity of the front edge of the cushion frame, wherein the flat spring member increases in tension accompanied by deformation of the seat back to perform a function to increase the intensity of the backward moment of the seat back.

In a further embodiment of the seat structure of the present invention, the frame member engaged with one end of the flat spring member and displacing backward by the backward moment toward the seat back includes a frame member comprising a back frame.

In a further embodiment of the seat structure of the present invention, the frame member engaged with one end of the flat spring member and displacing backward by the backward moment toward the seat back includes a frame member elastically supported in an independent state from the back frame, and provided at a position corresponding to the vicinity from the haunches to the waist of a driver, along the width direction of the seat.

In a further embodiment of the seat structure of the present invention, the frame member displacing backward by backward moment toward the seat back includes a frame member comprising the cushion frame, and is supported by an arm biased in a direction of backward tilt under a normal state by means of a torsion bar disposed along the width direction at a position to be deformed by an impact force equal to or stronger than that anticipated to the seat back.

In a further embodiment of the present invention, the seat structure further includes a stopper to control deformation of the cushion frame and the back frame under an impact force from front or back equal to or stronger than expected.

In a further embodiment of the seat structure of the present invention, the flat spring member includes one kind selected from a two-dimensional net member and a three-dimensional net member (solid knitted fabric) or a combination of two kinds or more thereof.

In a further embodiment of the seat structure of the present invention, a cushioning member includes one kind selected from a two-dimensional net member, a three-dimensional net member and a urethane material or a combination of two kinds or more thereof, and is disposed above said flat spring member in such a manner that one end thereof is in engagement with the frame member to be displaced backward along with deformation of the seat back by backward moment applied to the seat back and the other end is in engagement with a frame member disposed in the vicinity of the front edge of the cushion frame.

In a further embodiment of the seat structure of the present invention, the cushioning member includes a three-dimensional net member (solid knitted fabric) formed by connecting two layers of front and back of the ground knitted fabrics with connecting yarn.

In a further embodiment of the present invention, the seat structure further includes a portion without connecting yarn at an arbitrary position between one end and the other end of the three-dimensional net member where no connecting yarn is provided and the ground knitted fabrics directly face each other.

BRIEF DESCRIPTION OF DRAWINGS

FIGS. 4A, 4B and 4C show desirable examples of a three-dimensional net member (solid knitted fabric) used for a cushioning member, in which FIG. 4A shows the solid knitted fabric being strained on a seat frame before an impact force equal to or stronger than that prescribed being applied, FIG. 4B is a view showing a structure of a ground knitted fabric on the back side, and FIG. 4C shows a structure of the ground knitted fabric on the front side;

FIG. 7 is a view showing another example of a measurement result of the intensity of the backward moment;

DETAILED DESCRIPTION OF THE INVENTION

Figure 1:
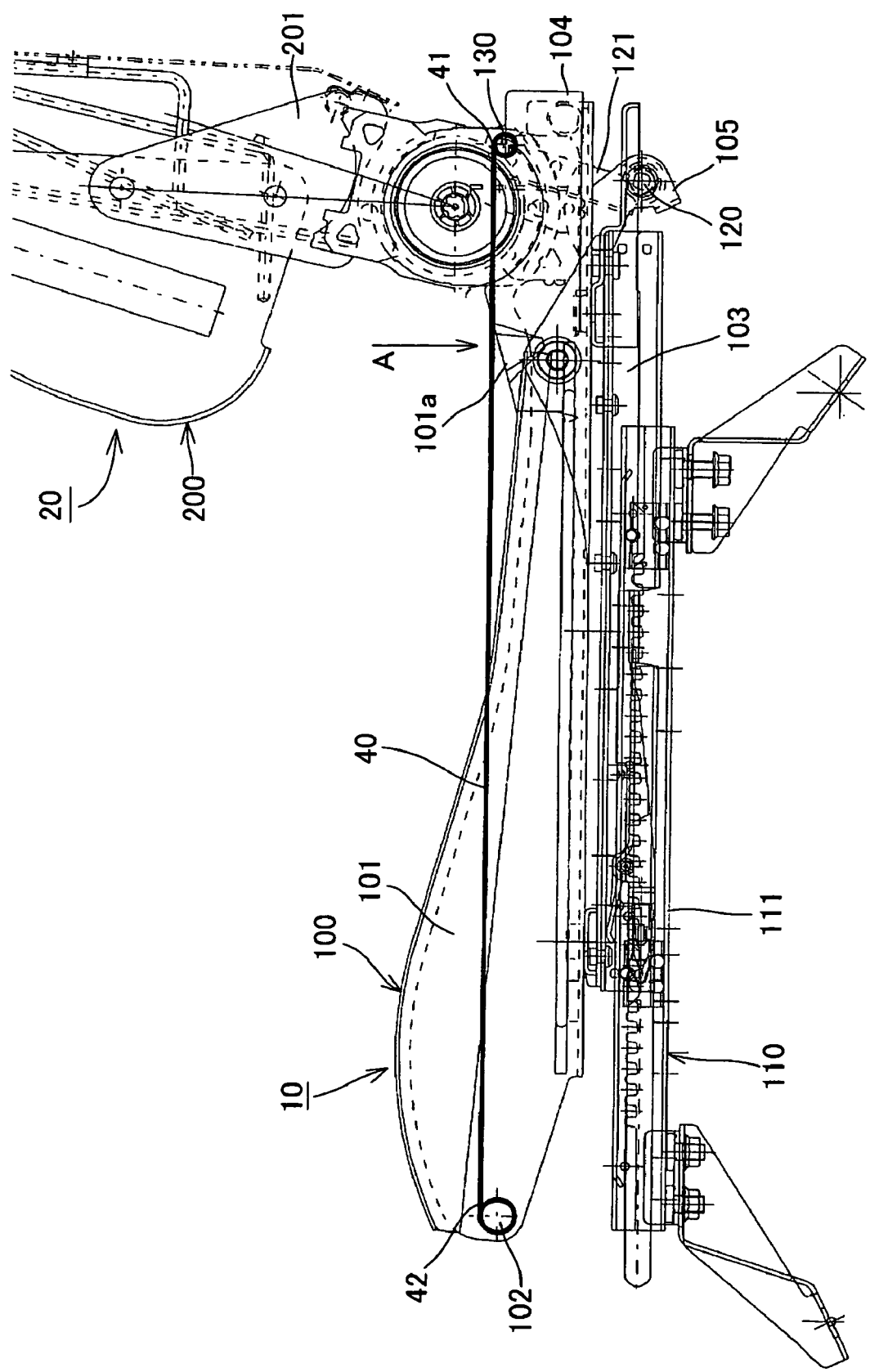
FIG. 1 is a schematic side elevational view showing a main portion of a seat structure relating to an embodiment of the present invention, being in a state before an impact force equal to or stronger than that prescribed is applied.
Figure 2:
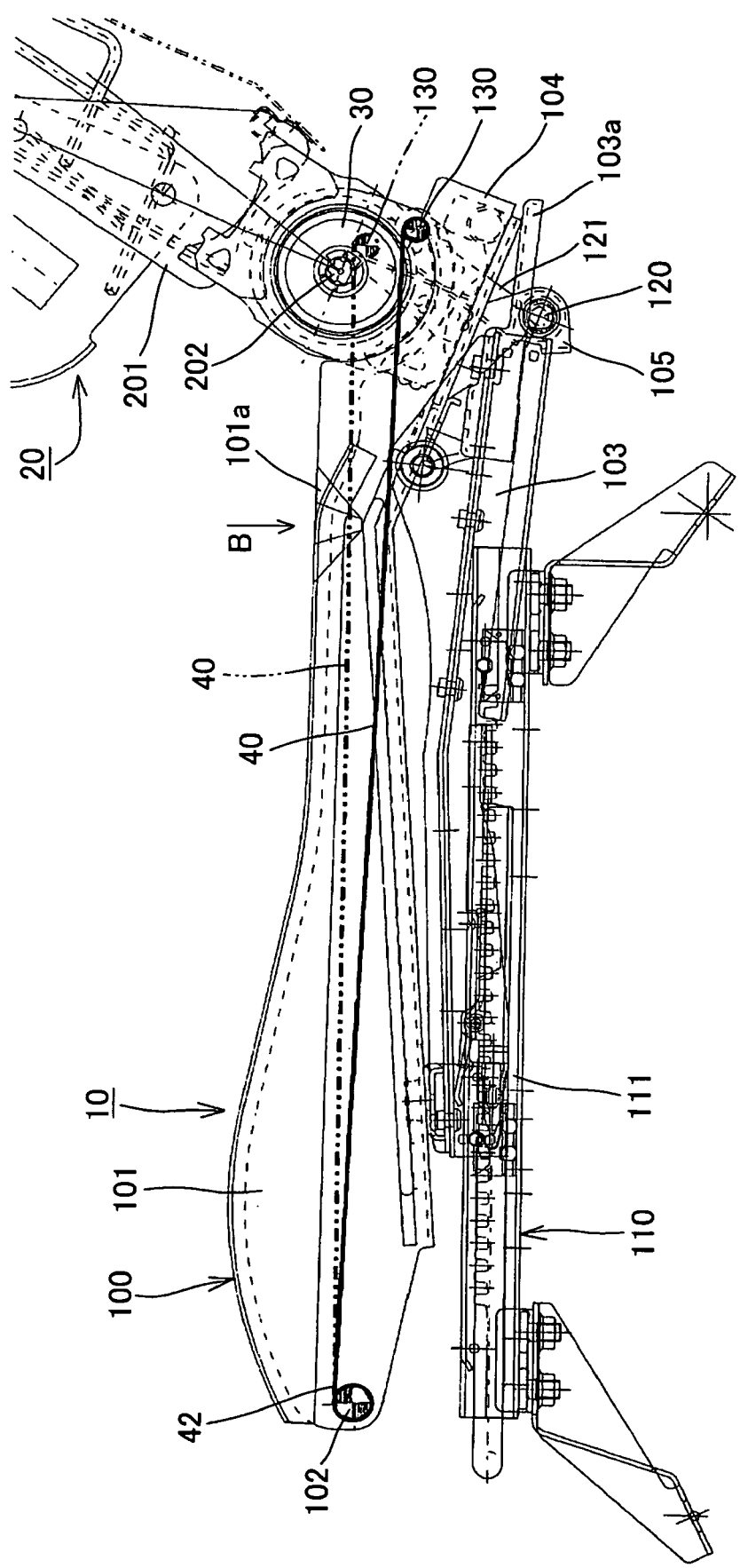
FIG. 2 is a schematic side elevational view showing a main portion of the seat structure relating to an embodiment of the present invention, being in a state after the impact force equal to or stronger than that prescribed is applied.

The present invention will be explained in more detail based on embodiments shown in the drawings. FIGS. 1 and 2 are views showing a main portion of a seat structure relating to an embodiment of the present invention. As shown in these drawings, a seat cushion 10 and a seat back 20 forming the seat structure of the present embodiment include a cushion frame 100 and a back frame 200 respectively.

The cushion frame 100 is formed with a plurality of frame members such as side frames 101 disposed apart from and opposite to each other in the width direction, a front edge frame 102 disposed between both front ends of the side frames 101 and the like so as to form nearly a square or the shape of a letter U seen from the top as a whole. To the side frame 101, a fixing bracket 103 is fixed along the bottom edge thereof and the side frame 101 is slidably supported by a rail 111 which forms a slide adjuster 110 via the fixing bracket 103.

Figure 3A:
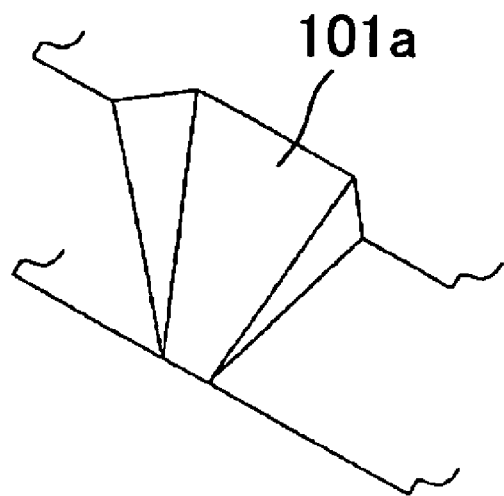
FIG. 3A is a sectional view taken along an arrow A in FIG. 1.
Figure 3B:
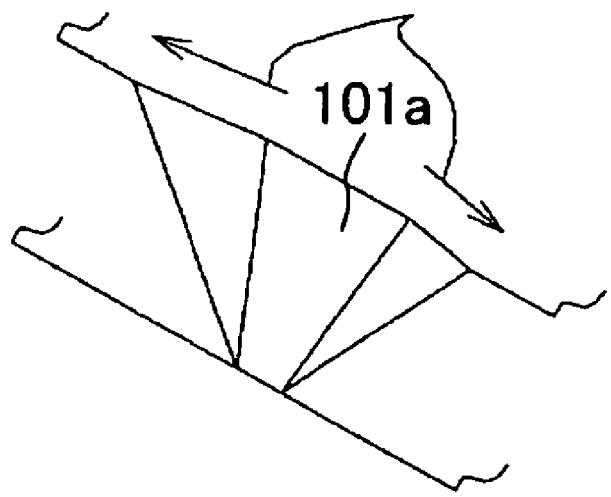
FIG. 3B is a sectional view taken along an arrow B in FIG. 2.

The side frame 101 which is one of the frame members of the cushion frame 100 deforms by a backward rotation moment (backward moment) against the seat back 20 (back frame 200), when an impact force equal to or stronger than that prescribed is applied in the longitudinal direction due to a head-on or rear-end collision as shown in FIG. 2. Due to such deformation of the side frame 101, the intensity of the backward moment of the seat back 20 is varied. In order to relieve the impact caused by the deformation at this time, a bead portion 101a which is bent to bulge outward is formed in the side frame 101, as shown in FIG. 1 and FIG. 3A, in the vicinity of the upper end edge of the side frame 101, at the position a little close to the back end from the central in the longitudinal direction. Through this structure, when an impact force equal to or stronger than that prescribed is applied to the seat back 20 as described above, the side frame 101 bends downward from the middle in the longitudinal direction with respect to the rail 111 of the slide adjuster 110 by the backward moment. At this time, since the bead portion 101a stretches in the longitudinal direction as shown in FIGS. 2 and 3B, proceeding of rupture of the side frame 101 is restrained so that the impact is relaxed.

A first bracket 104 is connected to the rear end of the side frame 101 of the cushion frame 100. The first bracket 104 is connected to a second bracket 201 via a reclining adjuster 30. The second bracket 201 is fixed to the bottom end of a back frame 200. Accordingly, the back frame 200 is provided so as to be able to recline with respect to the cushion frame 100 via the reclining adjuster 30. It should be noted that in the present embodiment, the first bracket 104 constitutes a portion of the cushion frame 100, and the second bracket 201 constitutes a portion of the back frame 200. It is needless to say that in the case of a structure without the reclining adjuster 30, the first bracket 104 and the second bracket 201 are directly connected with bolts or the like.

A projecting plate (not shown) projecting inward is provided in the first bracket 104 which constitutes the cushion frame 100 and is fixed at the rear end of the side frame 101, and a bracket for disposing the torsion bar 105 is fixed to the projecting plate so that the bracket 105 projects downward.

The brackets 105 for disposing the torsion bar 120 are provided on each side frame 101 disposed apart from each other at a prescribed distance in the width direction of the cushion frame 100, one end portion (fixed end) of a torsion bar 120 is fitted to a hole formed in one of the brackets 105 for disposing the torsion bar 120, and the other end portion (free end) of the torsion bar 120 is rotatably supported in a hole of the other bracket 105 for disposing the torsion bar 120. Accordingly, the torsion bar 120 is provided along the width direction of the seat cushion 10 or the cushion frame 100, and exhibits a prescribed spring characteristic by twisting of the free end side.

An arm 121 is fixed in the vicinity of each end portion of the torsion bar 120. One of the arms 121 disposed on the fixed end side of the torsion bar 120 is pivotably disposed to the torsion bar 120 at the base end portion thereof, and the other arm 121 disposed on the free end side of the torsion bar 120 is directly connected to the torsion bar 120 at the base end portion thereof, and is biased in a direction of backward tilt by twist torque thereof. A supporting frame 130 is disposed between the upper end portions of respective arms 121. Accordingly, the supporting frame 130 is elastically supported so as to be biased in a direction of backward tilt under a normal state by the spring characteristic of the torsion bar 120 via the arm 121.

The supporting frame 130 is used for a frame member to engage with one end 41 of a flat spring member 40. The other end 42 of the flat spring member 40 is engaged with the front edge frame 102 which is one of the frame members to compose the cushion frame 100. Accordingly, while the flat spring member 40 is supported by the front edge frame 102 at the other end 42, since one end 41 is biased backward by an elastic force of the torsion bar 120, the flat spring member 40 is strained in the longitudinal direction of the seat cushion 10 at a prescribed tension.

As a result that the flat spring member 40 is strained at a prescribed tension as described above, vibration in a usual range inputted in the direction of the normal can be dispersed in the facial direction so that the vibration can be effectively absorbed. In the case of the present embodiment, the flat spring member 40 is elastically supported by the torsion bar 120 via the supporting frame 130 and the arm 121. In other words, the torsion bar 120 biases the supporting frame 130 in a direction of backward tilt via the arm 121 as described above to strain the flat spring member 40, and the initial tension is adjusted so that the supporting frame 130 (arm 121) takes an unstably balanced position in an equilibrium state at the time of being seated. As a result, it becomes possible to react sensitively to a very little vibration, and at the same time, a firm feeling of stroke can be created owing to restorative power of the torsion bar 120. Especially, since the torsion bar 120 can create a well-balanced state, operating effectively the restorative power to displacement from no-load state to an equilibrium state, it has a high vibration absorptive function. Incidentally, the functions of the flat spring member 40 and the torsion bar 120 at the time when an impact force equal to or stronger than that prescribed is applied in the longitudinal direction by a head-on or rear-end collision will be described later.

Considering the object of the present invention, while the flat spring member 40 needs to be fixed in such a manner that it supplements an impact-resistant function exhibited by deformation of the seat frame (the cushion frame 100 and the back frame 200) to enhance impact resistance of the seat structure when an impact force equal to or stronger than that prescribed is applied in the longitudinal direction, it also needs to exhibit a sufficient vibration absorptive function even for a vibration usually inputted as described above. Though the flat spring member 40 is not to be limited so far as it is provided with such a function, the following member is used in the present embodiment.

Figure 8:
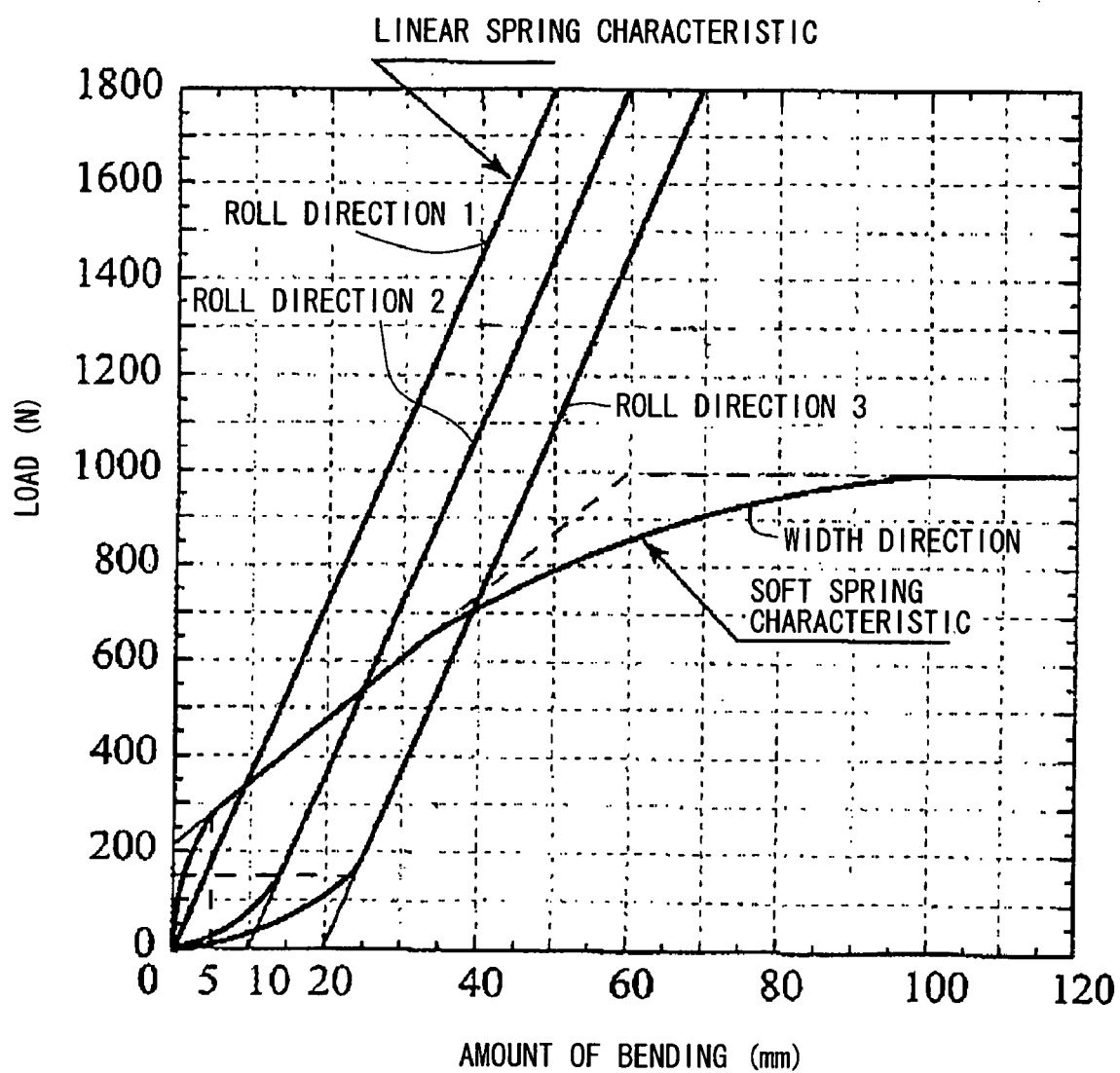
FIG. 8 is a view showing tensile properties of a two-dimentional net member used as a flat spring member.

That is, the flat spring member 40 used in the present embodiment includes elastic yarn, either of the warp or the weft is composed of elastic yarn such as-polyester elastomer fiber, polyurethane fiber or the like, and the other is composed of common yarn such as nylon fiber, polyester fiber or the like, which is smaller in elasticity than the elastic yarn. And desirably, as shown in FIG. 8, the flat spring member 40 should display a softening spring characteristic as tensile characteristics when pulled along the arrangement direction of the elastic yarn, and display a linear spring characteristic as tensile characteristics when pulled along the arrangement direction of the common yarn. When the flat spring member 40 is kept stretching by being applied an impact force equal to or more than that prescribed in the longitudinal direction, and the common yarn is finally ruptured, damping ratio can be increased by the softening spring characteristics. It should be noted that, as shown in FIG. 8, as for linear spring characteristics when pulled along a roll direction of the fabric material, which is the direction of common yarn arrangement, it is possible to have a structure without non-linear characteristics at all as is seen from roll direction 1, or a structure having non-linear characteristics in an initial bending region (a region in amount of bending to be usually 10 mm or less (roll direction 2) or 20 mm or less at maximum (roll direction 3)) by selecting materials or yarn diameter of the common yarn or the like. By taking a structure having non-linear characteristics in the initial bending region, a feeling of stroke at the time of being seated can be increased. Incidentally, the tensile characteristics shown in FIG. 8 are obtained by measuring in such a manner that using a test piece cut from the above-described two-dimensional net member in 200 mm long and 50 mm width, the test piece is pulled along the longitudinal direction at a rate of 50 mm/min by a test machine while taking a portion from each end in the longitudinal direction to 50 mm inside of the test piece as a margin for gripping. At this time, for the tensile characteristics along the arrangement direction of the elastic yarn, a test piece cut in such a manner that the arrangement direction of the elastic yarn being along the longitudinal direction is used, while for the tensile characteristics along the arrangement direction of the common yarn, a test piece cut in such a manner that the arrangement direction of the common yarn being along the longitudinal direction is used.

According to the seat structure of the present embodiment, at the time of normal use, absorption of vibration is achieved by the operation of the flat spring member 40 and the torsion bar 120 as described above. On the contrary, when an impact force equal to or stronger than that prescribed is applied in the longitudinal direction by a head-on or rear-end collision, since the human body is restrained by a seat belt or the like, a big load is generated in a direction of tilting the seat back 20 backward in any case. By a backward moment to tilt the seat back 20 in the backward turning direction, as shown in FIG. 2, the side frame 101 of the cushion frame 100 is deformed to bend downward at an arbitrary position from the vicinity of nearly central portion to the vicinity of the rear end, and around the position lower than the position where the flat spring member 40 is disposed in a normal state. At this time, the bead portion 101a provided in the vicinity of upper end edge of the side frame 101 stretches in the longitudinal direction as shown in FIG. 3B so that proceeding of rupture of the side frame 101 is restrained.

When the side frame 101 is deformed, the fixing bracket 103 which supports the side frame 101 on the rail 111 of the slide adjustor 110 similarly bends. In this event, since the amount of deformation of the side frame 101 is larger due to a difference in strength between the side frame 101 and the fixing bracket 103, the bottom end of the first bracket 104 integrally connected to the rear end of the side frame 101 abuts a rear end portion 103a of the fixing bracket 103 to temporarily restrain the deformation of the side frame 101. Accordingly, the rear end portion 103a of the fixing bracket 103 serves a function as a stopper to restrain the deformation of the side frame 101.

Figure 6:
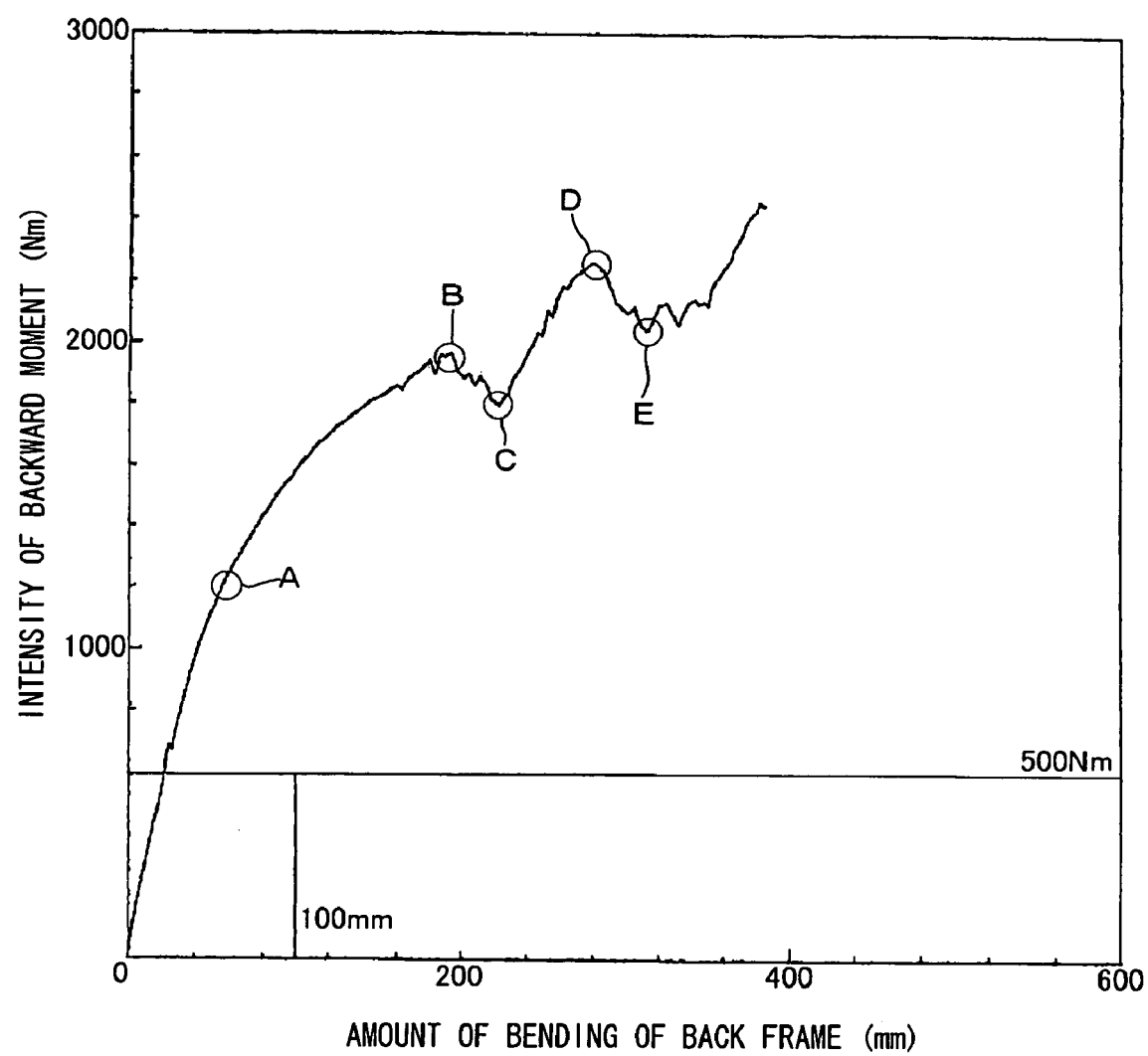
FIG. 6 is a view showing an example of a measurement result of the intensity of the backward moment.

At this time, the intensity of the backward moment which is yield strength against a backward turning direction of the back frame 200 gradually increases after receiving a prescribed impact force, as shown in FIG. 6, and at a point of A, the side frame 101 of the cushion frame 100 and the back frame 200 start deforming. Then, inclination in intensity of the backward moment slightly changes from the point A. When the flat spring member 40 is not provided, change in the intensity of the backward moment is greatly reduced at this time. However, according to the present embodiment, as the cushion frame 100 deforms, tension of the flat spring member 40 increases along with backward displacement of the back frame 200 to further increase the intensity of the backward moment. A point "B" is a point where deformation due to stretching of the bead portion 101a at the maximum or generation of cracks starts appearing as described above, and the intensity of the backward moment starts lowering from the point B. Since deformation of the side frame 101 is restrained when the side frame 101 abuts the rear end portion of the fixing bracket 103, tension of the flat spring member 40 greatly works from the time of abutting (point C) and the intensity of the backward moment starts to increase again. When deformation of the side frame 101 further proceeds, the intensity of the moment starts lowering again from a point D due to generation of a crack in the beat portion 101a stretched at the maximum or enlargement of the crack previously generated, but since tension of the flat spring member 40 becomes large, the intensity of the backward moment turns to increase again from point E.

Due to the deformation of the side frame 101 as described above, the intensity of the backward moment of the back frame 200 changes as described above. Previously, while the intensity of the backward moment of the back frame 200 is kept at a prescribed criterion by such a deformation behavior of the seat frame, during which the vicinity from the haunches to the waist of a human body pushes a thin cushioning member such as a solid knitted fabric or the like strained on the back frame 200 to allow it to operate as if buried into the back frame 200 so that the reaction of the human body is restrained. However, there is a limit, because this impact absorption mechanism utilizes only deformation behavior of the seat frame.

On the contrary, according to the present embodiment, when deformation of the side frame 101 proceeds and bending downward is going on as described above, since the bracket for disposing the torsion bar 105 which is fixed to the side frame 101, displaces also in a downward slanting direction, the arm 121 tilts backward along with displacement of the back frame 200 in a direction of backward tilt so that the supporting frame 130 is displaced backward. Since one end of the flat spring member 40 is supported by the supporting frame 130 and the other end of the flat supporting member 40 is engaged with the front edge frame 102, tension of the flat spring member 40 becomes high. Accordingly, as described above, even when inclination of the intensity of the backward moment is changed due to enlargement of the deformation of the side frame 101, since tension of the flat spring member 40 is increased as the amount of deformation of the side frame 101 and the amount of deformation of the back frame 200 in a direction of backward tilt are enlarged in the case of the present embodiment, the intensity of the backward moment can be enhanced by the tension of the flat spring member 40. As a result, tilting of the seat back 20 is restrained, and the back of a human body is supported by a cushion member such as a solid knitted fabric strained by the back frame 200 more reliably than by the prior art. In other words, in the present embodiment, the flat spring member 40 performs mainly vibration absorptive function in normal times, but when a large impact force as described above is inputted, it functions as a high-impact resistant material to enhance the intensity of the backward moment of the back frame 200.

FIG. 7 shows the intensity of the backward moment measured while disposing the flat spring member 40 similarly to the above, to a seat frame structure in which material of a little higher strength than the material used in the test in FIG. 6 is used as respective frame members to compose the cushion frame 100 and the back frame 200, without using a stopper for stopping deformation of the cushion frame 100 such as the rear end portion 103a of the fixing bracket 103 described above.

As shown in FIG. 7, in the case of this example, deformation occurs to the cushion frame 100 and the back frame 200 at point F, and thereafter the function of tension of the flat spring member 40 is added to create the intensity of backward moment of more than 3000 Nm. Then, a large deformation of the cushion frame 100 or the back frame 200, or stretch, crack, or the like in the bead portion occurs, which lowers the intensity of the backward moment at point G, but the tension of the flat spring member 40 becomes high again, and the intensity of the backward moment increases again from point H. When deformation of the cushion frame 100 and the back frame 200, cracks, or the like becomes large again, the intensity of the backward moment begins to lower again from point I, and it begins to increase again by tension increase of the flat spring member 40 when arriving at point J.

In the case of relying on the intensity of the cushion frame 100 or the back frame 200, it is not easy to attain the intensity of the backward moment to be equal to or more than 3000 Nm. If such a structure is realized, it is expected to be considerably heavy. However, by adding the flat spring member 40 as a high-impact material as in the present embodiment, it is found it easy to attain the intensity of the backward moment to be equal to or more than 3000 Nm. As for the cushion frame 100 or the back frame 200, it is enough to select the one being a little high in strength, so that a structure having high intensity of the backward moment being light in weight can be realized.

Note that the measurement of the intensity of the backward moment shown in FIGS. 6 and 7 is carried out in either case by setting a designed hip point (H. P) of an apparatus in which a loading jig is provided to a back pan of a three-dimensional mannequin to a designated seating position on the seat structure, and applying a backward load (at a loading speed of 0.5 deg/s) to generate a moment of 588 Nm/person around H. P to the seat back.

The cushioning members of urethane material or a solid knitted fabric are disposed above the flat spring members 40 provided on the cushion frame 100 and the back frame 200 respectively. It is needless to say that these cushioning members are sometimes used as a surface material also with themselves or they may be further covered with another surface material such as a leather.

Figure 4A:
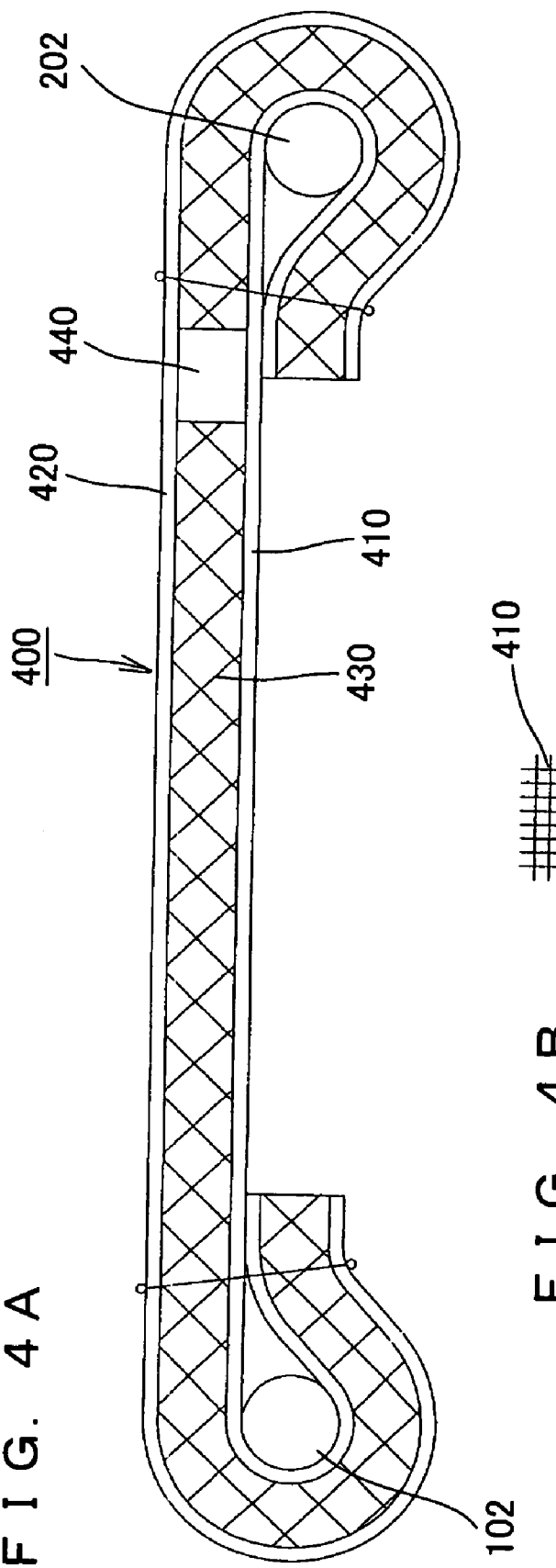
Figure 4B:
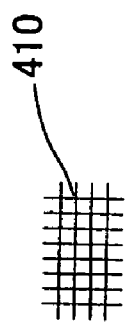
Figure 4C:
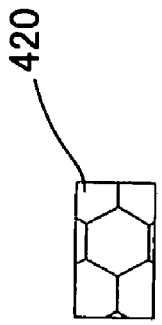
Figure 5:
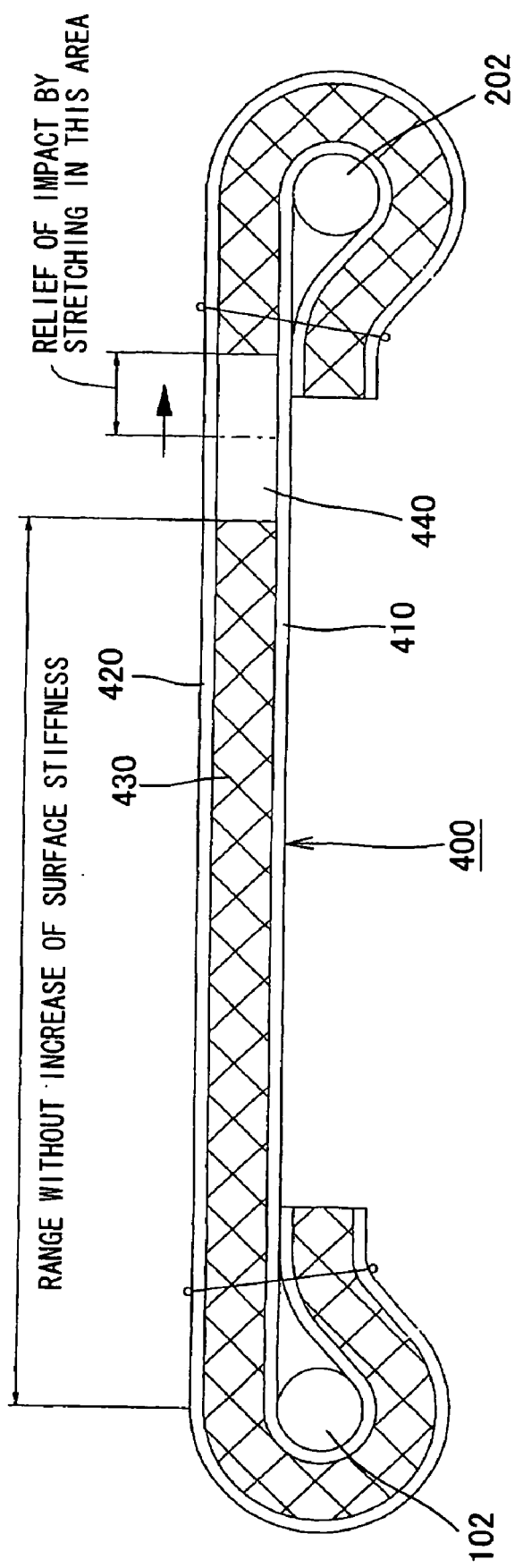
FIG. 5 is a view showing a solid knitted fabric in a state after an impact force equal to or stronger than that prescribed is applied.

It is desirable to use a solid knitted fabric 400 as shown in FIGS. 4 and 5 as a cushioning member. The solid knitted fabric 400 is formed by allowing connecting yarn 430 to reciprocate between two layers of front and back ground knitted fabrics 410 and 420 disposed apart from and opposite to one another to connect both. The solid knitted fabric 400 is light in weight and air-permeable, and has a sufficient function as a cushioning member even with the thickness of about several millimeters to several tens millimeters due to a restoring force by a tilt of the connecting yarn 430, friction between connecting yarn 430, friction between connecting yarn 430 and yarn composing the ground knitted fabrics 410 and 420, and deformation of meshes of the ground knitted fabrics 410 and 420.

The ground knitted fabric 410 used for a back layer is, for instance as shown in FIG. 4B, formed with a flat knitted structure (small mesh) continuing in any directions of wale and course from yarn twined of monofilaments. On the other hand, the ground fabric 420 used for a front layer is formed in a stitch structure having a honeycomb (hexagonal) mesh from yarn twined of monofilaments as shown in FIG. 4C. Needless to say, this knitted fabric structure is just an example, and a mesh structure or a knitted fabric structures except a honeycomb structure can be adopted. The connected yarn 430 is used for knitting between the pair of the ground knitted fabrics 410 and 420, so that the ground knitted fabric 420 being the front layer and the ground knitted fabric 410 being the back layer can maintain a prescribed distance to give prescribed stiffness to the solid knitted fabric 400.

When the above-described solid knitted fabric 400 is strained on the cushion frame 100 is provided, as shown in FIG. 4A, by engaging the front end with the front edge frame 102, and the rear end is engaged with a bottom frame 202 provided at the lower part of the back frame 200 for instance. Incidentally, though not shown, the side edge portion is engaged with the side frame 101. It is desirable that the solid knitted fabric 400 provided on the cushion frame 100 is not provided with connecting yarn 430 in a portion thereof, as shown in FIGS. 4A, 4B and 4C, and of a structure including a portion without connecting yarn 440 where the ground knitted fabrics 410 and 420 directly face each other.

In the case of using such a solid knitted fabric 400, when the cushion frame 100 and the back frame 200 reach a state shown in FIG. 2 from a state shown in FIG. 1 under application of an impact force equal to or more than that prescribed in the longitudinal direction, since the bottom frame 202 displaces rearward, more correctly in a rearward slanting direction, the solid knitted fabric 400 stretches in the longitudinal direction as shown in FIG. 5 from a state shown in FIG. 4A. As a result, the tension of the solid knitted fabric 400 in the longitudinal direction is enhanced to serve as a function to supplementary further increase the intensity of the backward moment increased by the tension of the above-described flat spring member 40.

However, in the case of a structure having no portion without connecting yarn 440, the ground knitted fabrics 410 and 420 stretch and the connecting yarn 430 tilts at the same time, the total thickness becomes thinner, which heightens the surface stiffness in the thickness direction (direction of the normal) to lower the cushioning ability in the direction of the normal. On the contrary, in the case of a structure including the portion without connecting yarn as in the present embodiment, since positions directly facing each other in the portion without connecting yarn 440 is to be intensively stretched, between the ground knitted fabrics 410 and 420, as shown in FIG. 5, the connecting yarn 430 disposed in positions other than the portion without connecting yarn 440 do not tilt so much, and keep nearly the same state as that before the impact force is applied. As a result, lowering of the impact force in the direction of the normal accompanied by the stretch in the longitudinal direction is restrained, so that a relieving function of the impact force generated especially in the vertical direction can be enhanced when an impact force is applied.

The solid knitted fabric 400 described above is disposed above the flat spring member 40, but it is also possible to use the solid knitted fabric 400 itself as a flat spring member 40, and to engage the rear end of the solid knitted fabric 400 with the supporting frame 130 supported by the torsion bar. Even in this case, by making it a structure to be provided with the portion without connecting yarn 430, the ground knitted fabrics 410 and 420 at a position corresponding to the portion without connecting yarn 440 are stretched, thereby restraining deformation of the cushion frame 100 and the back frames 200, exhibiting a function to enhance the intensity of the backward moment of the seat back 20, restraining excessive tilt of the connecting yarn 430, and making the cushioning ability in the vertical direction exhibit sufficiently.

Figure 9:
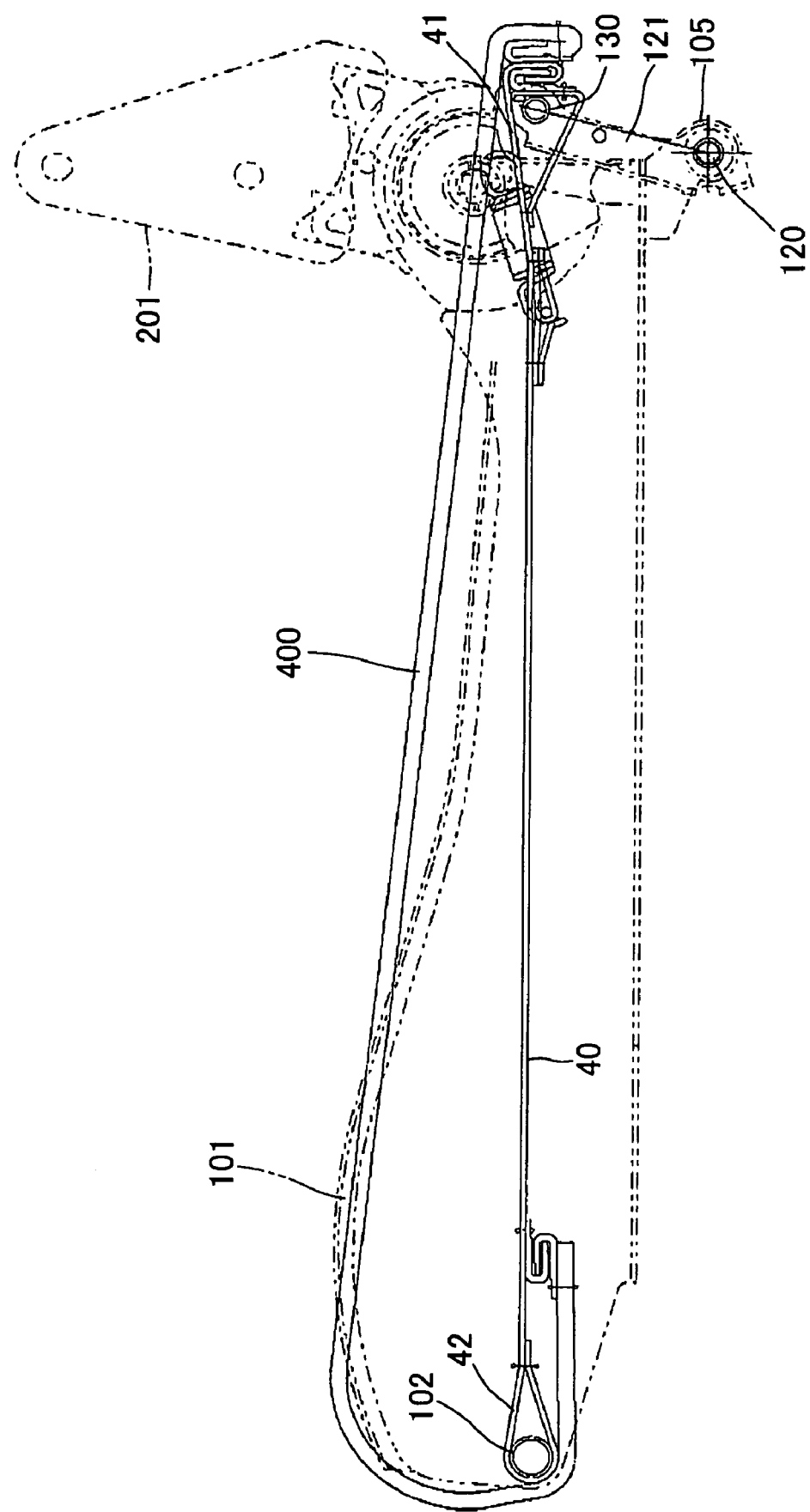
FIG. 9 is a view showing an appearance in a no-load state, when supported by a supporting frame which is biased backward together with the cushioning member and a flat spring member by a torsion bar.
Figure 10:
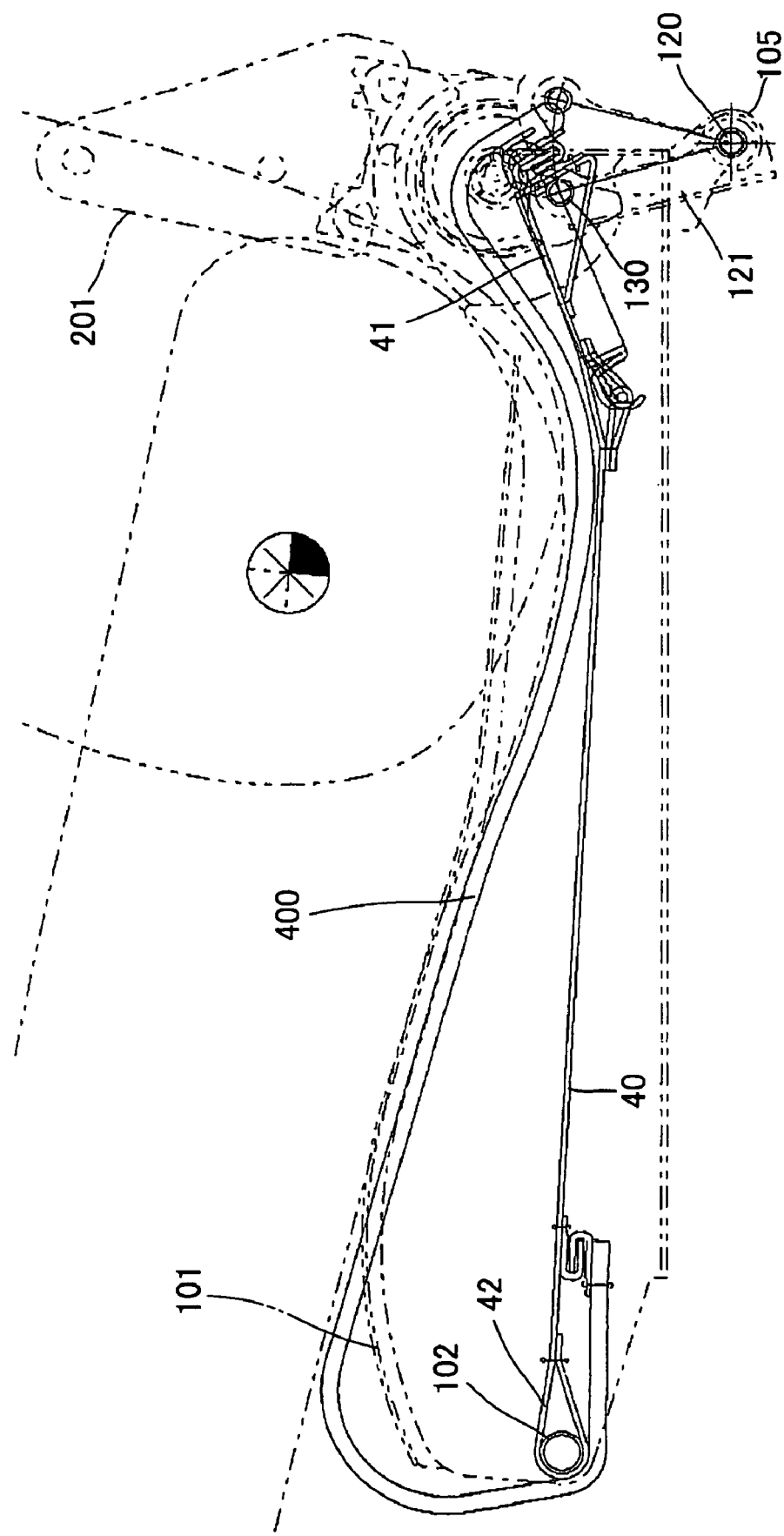
FIG. 10 is a view showing the cushioning member in a state of being seated by a person.

As shown in FIG. 9, it is also possible to adopt a structure in which one end 41 of the flat spring member 40 and the rear end of the solid knitted fabric 400 are engaged together with the supporting frame 130 supported by the torsion bar. In this case, since the supporting frame 130 is biased in the direction backward tilt by an elastic force of the torsion bar at the time of no load, the solid knitted fabric 400 strained on the front sides shows an appearance without needless shrinks and folds. On the other hand, when a person is seated, since the supporting frame 130 is tilted forward as shown in FIG. 10, the solid knitted fabric 400 does not increase in tension but creates slack. Therefore, the cushioning ability in the thickness direction included in the solid knitted fabric 400 can be exhibited sufficiently. It should be noted that it is desirable to use the solid knitted fabric 400 as described above, it is also possible to use comparatively thin urethane material.

INDUSTRIAL APPLICABILITY

A seat structure of the present invention has a structure in which a flat spring member mainly serving as a vibration absorptive function at a normal use is engaged with an arbitrary frame member which displaces backward along with deformation of a seat back by backward moment applied to the seat back, and the other end is engaged with a frame member disposed in the vicinity of the front edge of a cushion frame. Therefore, when an impact force from front or back equal to or more than that prescribed is applied, the flat spring member increases in tension by backward moment applied to the seat back, and serves as a function to increase the intensity of the backward moment of the seat back. Therefore, according to the present invention, high intensity of the backward moment can be exhibited compared with that in the prior art so that further improvement of the impact resistance can be realized.

The invention claimed is:

1. A seat structure, comprising:
    a flat spring member disposed in such a manner that one end is in engagement with a first frame member to be displaced backward by backward moment, which deforms a seat back under an impact force from front or back, and the other end is in engagement with a second frame member disposed in the vicinity of the front edge of a cushion frame,
    wherein the flat spring member increases in tension as said seat back is deformed and wherein the first frame member is engaged with one end of said flat spring member and displacing backward by the backward moment toward said seat back wherein the first frame member is elastically supported in an independent state from the back frame, and provided at a position corresponding to the vicinity from a driver's haunches to the driver's waist, along the width direction of the seat.

2. The seat structure according to claim 1, wherein the first frame member engaged with one end of said flat spring member and displacing backward by the backward moment toward said seat back includes a frame member comprising a back frame.

3. The seat structure according to claim 1, further comprising:
    a stopper to control deformation of the cushion frame and back frame under an impact force from front or back equal to or stronger than that prescribed.

4. The seat structure according to claim 1, wherein said flat spring member comprises one kind selected form a two-dimensional net member and a three-dimensional net member or a combination of two kinds or more thereof.

5. The seat structure according to claim 1,
wherein said cushion member comprises one kind selected from a two-dimensional net member, a three-dimensional net member and a urethane material or combination of two kinds or more thereof, and is disposed above the flat spring member in such a manner that one end thereof is in engagement with the first frame member to be displaced backward along with deformation of the seat back by backward moment applied to the seat back and the other end is in engagement with a second frame member disposed in the vicinity of the front edge of the cushion frame.

6. The seat structure according to claim 5, wherein said cushioning member comprises a three-dimensional net member formed by connecting two layers of front and back of ground knitted fabrics with connecting yarn.

7. The seat structure according to claim 6, further comprising:
a portion without connecting yarn at the arbitrary position between one end and the other end of said three-dimensional net member where no connecting yarn is provided and the ground knitted fabrics directly face each other.

8. A seat structure, comprising:
a cushion frame provided with a frame member deforming under an impact force from front or back; and
a flat spring member disposed in such a manner that one end thereof is in engagement with a first frame member to be displaced backward along with deformation of a seat back by backward moment applied to said seat back, and the other end is in engagement with a second frame member disposed in the vicinity of the front edge of the cushion frame,
wherein the flat spring member increases in tension accompanied by deformation of said seat back to perform a function to increase the intensity of the backward moment of the seat back and wherein the first frame is displaced backward by backward moment toward said seat back is supported by an arm biased in a direction of backward tilt under a normal state by means of a torsion bar disposed along the width direction at a position to be deformed by an impact force equal to or stronger than that prescribed to said seat back.

9. The seat structure according to claim 8, wherein the first frame member engaged with one end of said flat spring member and displacing backward by the backward moment toward said seat back includes a frame member comprising a back frame.

10. The seat structure according to claim 8, wherein the first frame member engaged with one end of said flat spring member and displacing backward by the backward moment toward said seat back comprises a frame member elastically supported in an independent state from the back frame, and provided at a position corresponding to the vicinity from a driver's haunches to the driver's waist, along the width direction of the seat.

11. The seat structure according to claim 10, wherein the first frame displacing backward by backward moment toward said seat back comprises a frame member composing said cushion frame, and is supported by an arm biased in a direction of backward tilt under a normal state by means of a torsion bar disposed along the width direction at a position to be deformed by an impact force.

12. The seat structure according to claim 8, further comprising:
a stopper to control deformation of the cushion frame and the back frame under an impact force from front or back.

13. The seat structure according to claim 8, wherein said flat spring member comprises one kind selected from a two-dimensional net member and a three-dimensional net member or a combination of two kinds or more thereof.

14. The seat structure according to claim 8, wherein said cushion member comprises one kind selected from a two-dimensional net member, a three-dimensional net member and a urethane material or a combination of two kinds or more thereof, and is disposed above the flat spring member in such a manner that one end thereof is in engagement with the first frame member to be displaced backward along with deformation of the seat back by backward moment applied to the seat back and the other end is in engagement with a frame member disposed in the vicinity of the front edge of the cushion frame.

15. The seat structure according to claim 14, wherein said cushioning member comprises a three-dimensional net member formed by connecting two layers of front and back of ground knitted fabrics with connecting yarn.

16. The seat structure according to claim 15, further comprising:
a portion without connecting yarn at a position between one end and the other end of said three-dimensional net member where no connecting yarn is provided and the ground knitted fabrics directly face each other.

* * * * *